April 25, 1950 D. MITCHELL 2,505,566

SIGNALING SYSTEM

Filed July 23, 1945 2 Sheets-Sheet 1

INVENTOR
D. MITCHELL

BY R. O. Covell

ATTORNEY

April 25, 1950 D. MITCHELL 2,505,566

SIGNALING SYSTEM

Filed July 23, 1945 2 Sheets-Sheet 2

INVENTOR
D. MITCHELL

BY R. O. Covell
ATTORNEY

Patented Apr. 25, 1950

2,505,566

UNITED STATES PATENT OFFICE 2,505,566

SIGNALING SYSTEM

Doren Mitchell, Martinsville, N. J., assignor to Bell Telephone Laboratories, Incorporated, New York, N. Y., a corporation of New York Application July 23, 1945, Serial No. 606,658

4 Claims. (Cl. 177—353)

Figure 1:
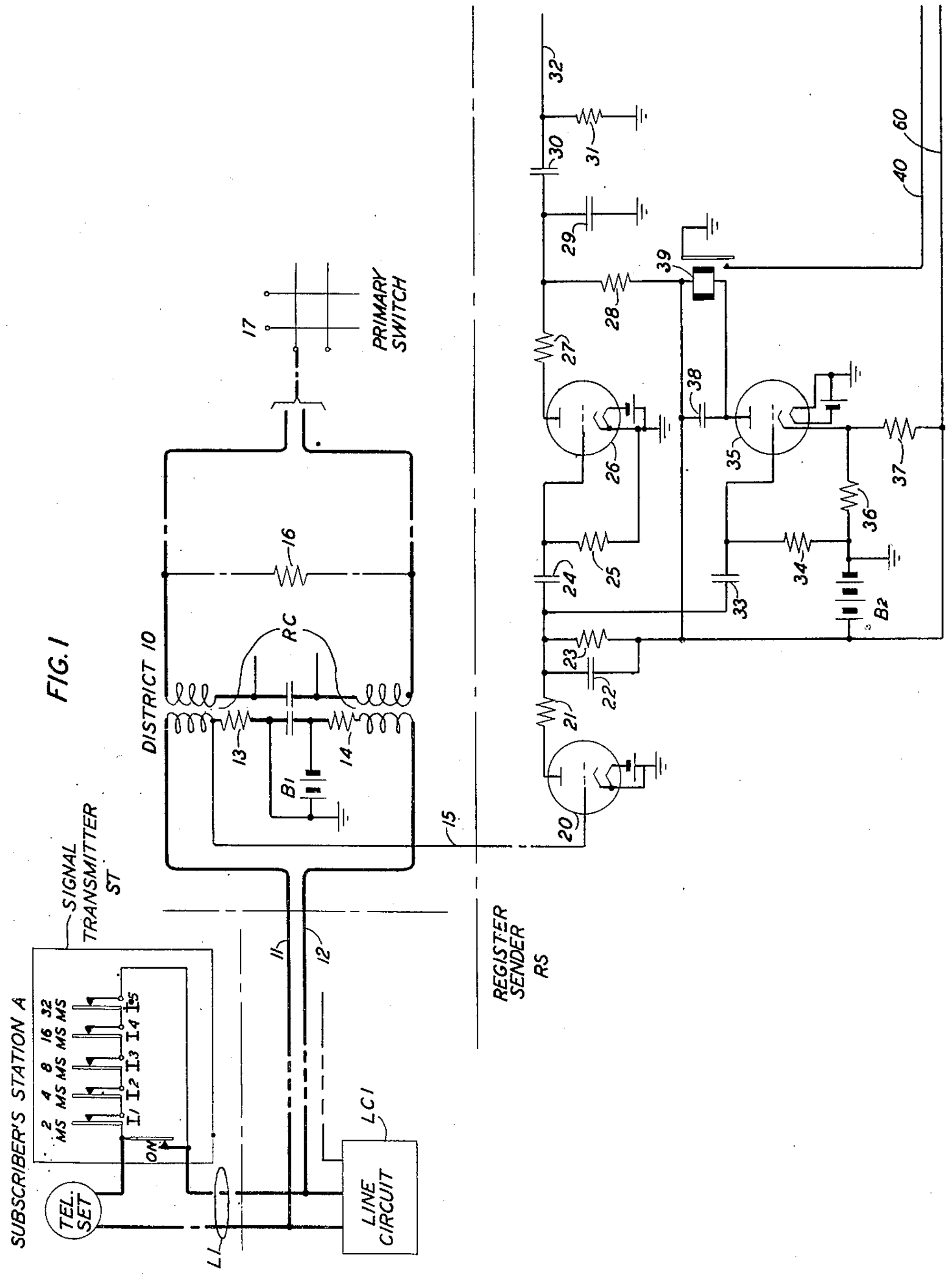

This invention relates to selective signaling systems and particularly to selective signaling in automatic and semi-automatic telephone systems.

Objects of the invention are an increase in the efficiency, speed and reliability of selective signaling systems.

This invention is a selective signaling system and a method of signaling in which each of a plurality of different selective signals is transmitted by the same number of successive signal impulses, the duration of each of which may be any one of a plurality of predetermined intervals of time depending upon the particular signal being transmitted.

A feature is a signaling system in which each of a plurality of different signals consists of a particular number of successive signal impulses and in which each of said signals differs from the others in the duration of one or more of its impulses, and in which means is provided for preventing a signal indication responsive to a succession of impulses differing in number from said particular number.

A further feature of the invention is a signaling system in which each of a plurality of different signals is transmitted by two successive signal impulses, the duration of each of which may be any one of a plurality of predetermined intervals of time so that each signal is represented by a different impulse duration code.

A further feature of the invention is a signaling system in which each of ten signals corresponding to the digits 1 to 0 is transmitted by two successive signal impulses, the duration of one of which may be equal to any one of five different predetermined intervals of time and the duration of the other of which may be equal to any one of four of said five intervals, the two impulses representing each digit differing from the two impulses representing any other digit in the duration of one or both of the impulses.

The drawing which forms a part of this specification discloses a portion of an automatic telephone system in which the invention and its features are embodied. The invention is however not limited in its application to the particular system and arrangement shown but is generally applicable to selective signaling.

Figure 2:
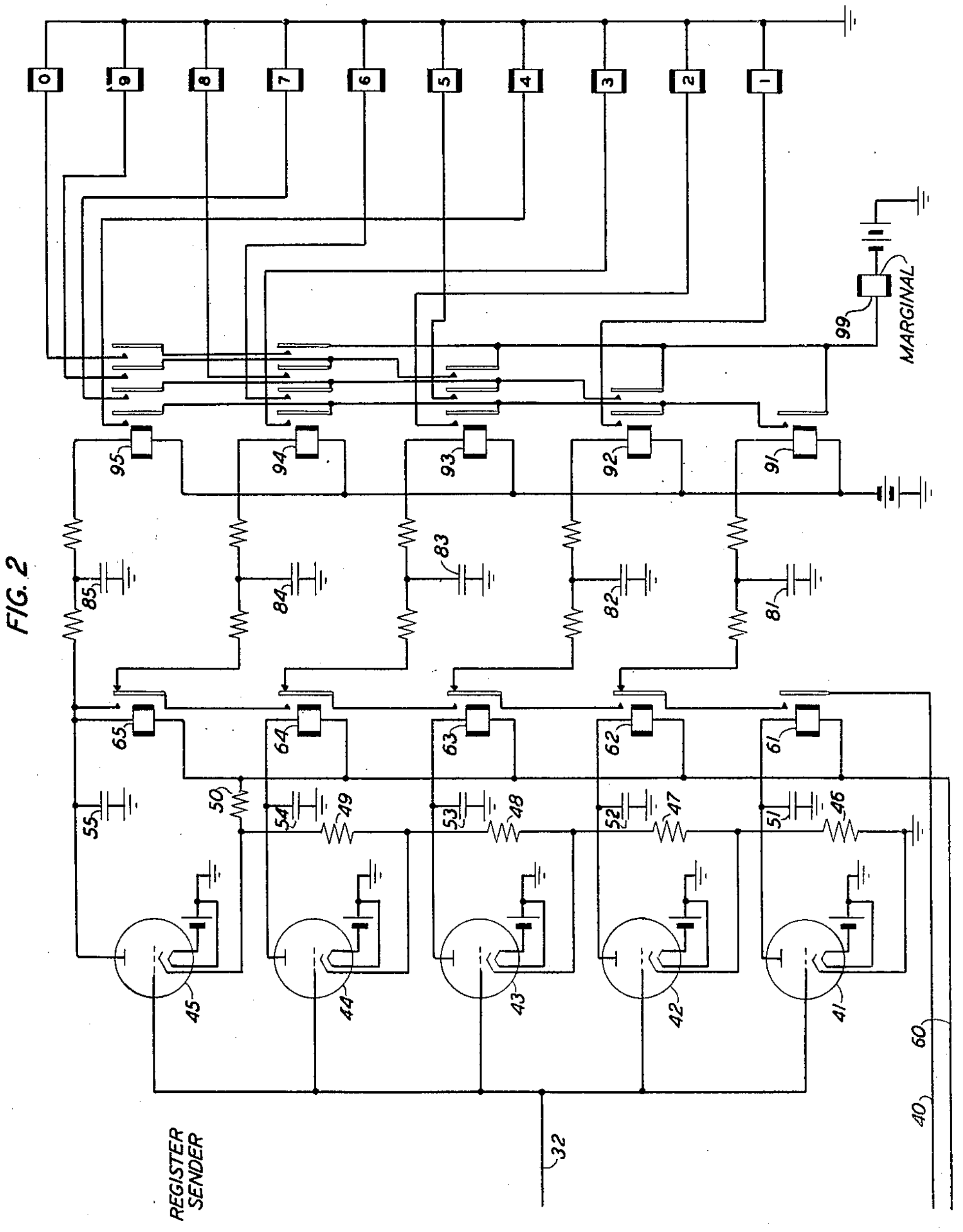

In the drawing, Fig. 1 discloses a telephone subscriber's station A including a signal transmitter ST connected by a line L1 to a central office comprising a district 10 and provided with cross bar switches; and Figs. 1 and 2 disclose the signal receiving part of a register sender RS of the system.

The subscriber's telephone set is of the usual common battery type. The signal transmitter is shown as including five impulse transmitting contacts I1, I2, I3, I4 and I5 and an off-normal contact ON which short-circuits the impulse contacts except during the transmission of the impulses for each code or numerical digit. Each of the transmitting contacts is opened, when actuated, for a different interval of time. For instance, contact I1 may be opened for .002 second, contact I2 for .004 second, contact I3 for .008 second, contact I4 for .016 second, and contact I5 for .032 second. The duration of the opening of the various contacts is arranged in a geometric progression instead of in an arithmetical progression so that percentage variations in duration are less likely to cause errors. The interval which separates the two impulses of a signal may be about .015 second and the interval which occurs between digits will be about .2 second. The signal transmitter for opening the transmitting contact I1, I2, I3, I4 and I5 may be similar to that disclosed in the patent to R. F. Mallina No. 2,315,344, granted March 30, 1943, each reed being designed to give the desired time of vibration during which the associated contact will be opened. The two reeds which are operated by each digit lever will be actuated in succession instead of simultaneously as in the Mallina patent. Alternatively, the signal transmitter may be similar to that disclosed in the patent to J. G. Roberts and C. D. Richard No. 2,246,698, granted June 24, 1941, which transmitter is arranged to transmit two impulses for each digit, each impulse being any one of a plurality of different lengths. With such a signal transmitter the five contacts I1, I2, I3, I4 and I5 in series will be replaced by a single interrupter contact which is opened twice for each digit. The signal code is as follows:

| Length of Impulse in mil seconds | | | Length of Impulse in mil seconds | | |
|---|---|---|---|---|---|
| Digit | 1st Impulse | 2nd Impulse | Digit | 1st Impulse | 2nd Impulse |
| 1 | 2 | 4 | 6 | 4 | 16 |
| 2 | 2 | 8 | 7 | 4 | 32 |
| 3 | 2 | 16 | 8 | 8 | 16 |
| 4 | 2 | 32 | 9 | 8 | 32 |
| 5 | 4 | 8 | 0 | 16 | 32 |

If an additional transmitting contact is provided, the code may be expanded to fifteen signals; or, if the signal transmitting and receiving means are modified, fifteen signals may be obtained by including signals for which the two impulses are of equal duration.

The line circuit LC1 comprises the usual line and cut-off relays which are effective responsive to the initiation of a call at the associated subscriber's station to start a line finder or operate a line switch to connect the line to a first selector or district circuit. As shown in the drawing, the line L1 is connected through a district circuit 10 to a primary switch 17 on a district link frame. The resistances 13 and 14, connected in series with the repeating coil and central office battery B1, enable the connection of the input conductor 15 of the signal receiving part of the register sender to the district without unbalancing the line. The longer impulses represent such low frequencies that they would in effect be partially shunted out by the repeating coil if the impulse receiving circuit was connected directly to one side of the line; but by connecting the impulse receiving circuit to resistor 13, as shown, the most favorable ratio of impulse signal to speech is obtained. The resistance 16 may be provided for connection as a line termination to improve the signal shaping on long lines.

The district 10 and register sender are in general similar in function and operation to districts and senders disclosed and described in detail in the patents to Carpenter 2,089,921, granted August 10, 1937, and 2,235,803, granted March 18, 1941.

The signal receiving means provided in the register sender comprises amplifier tubes 20, 26 and 35, a relay 39, time identifying tubes 41, 42, 43, 44 and 45 and time identifying relays 61, 62, 63, 64 and 65. The signal receiver further includes circuit means comprising relays 91, 92, 93, 94 and 95 for translating the received impulse combinations into digit signals. The electromagnets numbered 1 to 0 represent intermediate signal relays which successively respond to each digit signal and in turn effect the operation of the various digit registers (not shown) in any desired known manner.

Assume that the line L1 has been connected to the district 10 responsive to the initiation of a call at the subscriber's station A and that a sender RS has been associated with the district 10, whereupon dial tone is transmitted to the subscriber in usual and well-known manner. The calling subscriber then actuates the signal transmitter ST to transmit the office code and numerical digits of the directory number of the subscriber's station with which a conversational connection is desired. The circuit for transmitting the code and numerical digit signals over line L1 is traced from central office battery B1, through resistor 14, lower left winding of repeating coil RC of district 10, conductor 12, one conductor of line L1, signal transmitter ST and telephone set at station A, other conductor of line L1, conductor 11, upper left winding of repeating coil RS and resistor 13 to ground. Thus the potential difference between the grid and cathode of tube 20 of the signal receiving part of the register sender RS depends on the voltage drop through resistor 13; and the grid of tube 20 is normally negative with respect to the cathode but not necessarily sufficiently so to entirely prevent cathode-anode current. When one of the signal transmitting contacts is opened to transmit a digit signal, the voltage drop in resistor 13 becomes zero and therefore the grid of tube 20 goes to the same voltage as the cathode thus causing a surge of current in the cathode-anode circuit. The resistor 21 and condenser 22 introduce a degree of filtering to aid in discriminating against voice currents. The increased current through resistor 23 reduces the charge on each of condensers 24 and 33, thus introducing a voltage drop through each of resistors 25 and 34 so that the grid of each of tubes 26 and 35 becomes more negative with respect to its cathode. Normally there is no difference of potential between the grid and cathode of tube 26; whereas the grid of tube 35 is normally biased by the voltage drop through resistor 36. Thus, the surge of current in the anode-cathode circuit of tube 20 at the beginning of a signal impulse from station A causes a reduction in the cathode-anode current of tube 26; but, since tube 35 is normally biased to cut-off, there is no effect on relay 39 at the start of a signal impulse. The time constants of the circuit including resistor 23, condenser 24 and resistor 25 are such that the signal impulses of from .002 to .032 second in length are satisfactorily reproduced in the cathode-anode circuit of tube 26. The aforementioned decrease in the anode-cathode current of tube 26 reduces the voltage drop through resistor 28 so that the voltage applied across condenser 29 tends to increase. The time constants of resistor 28 and condenser 29 are such that the change is proportional to the length of the signal impulse. A limiting action is obtained in tubes 20 and 26 so that the amplitude of the impulses through resistor 27 is independent of their amplitude at the grid of tube 20. As the voltage across condenser 29 increases, the voltage drop through resistor 31 increases due to current charging condenser 30, so that conductor 32 and the grid of each of time identifying tubes 41, 42, 43, 44 and 45, become more positive with respect to their cathodes. The time constants of condenser 30 and resistor 31 are made sufficiently long so that voltage changes across condenser 29 are repeated on the grids of the time identifying tubes. The difference in potential between the cathodes and anodes of these tubes is controlled by a potentiometer comprising resistors 46, 47, 48, 49 and 50; whereby the voltage applied to conductor 32 due to a signal impulse of .002 second in length causes a cathode-anode current in tube 41 sufficient to operate the time identifying relay 61; whereby the voltage applied to conductor 32 due to an impulse of .004 second in length causes a cathode-anode current in tube 42 sufficient to operate the time identifying relay 62; whereby the voltage applied to conductor 32 due to an impulse of .008 second in length causes a cathode-anode current in tube 43 sufficient to operate the time identifying relay 63; whereby the voltage applied to conductor 32 due to an impulse of .016 second in length causes a cathode-anode current in tube 44 sufficient to operate the time identifying relay 64; and whereby the voltage applied to conductor 32 due to an impulse of .032 second in length causes a cathode-anode current in tube 45 sufficient to operate the time identifying relay 65. Thus relays 61 to 65 are operated successively by a signal impulse, the last one of the relays to be operated indicating the length of the received signal impulse. Condensers 51, 52, 53, 54 and 55 discharge rapidly through their respective tube circuits but must be charged through their associated time identifying relays thereby insuring the operation of the relays even though the cathode-anode current through the associated tube is of short duration.

At the end of each signal impulse transmitted from station A, the grid of tube 20 again becomes negative with respect to the cathode so as to decrease the cathode-anode current of tube 20, increase the anode-cathode current of tube 26, and terminate the cathode-anode current in the time identifying tubes. The aforementioned decrease in the cathode-anode current of tube 20, when the signal impulse ends, causes the grid of tube 35 to become more positive with respect to the cathode so that there will be a surge of current in the cathode-anode circuit of tube 35 sufficient to effect the operation of relay 39. The operation of relay 39 connects ground to conductor 40 to effect the operation of one of the translating relays 91 to 95, the operative energization of the time identifying relays being continued by current charging the associated one or ones of condensers 51, 52, 53, 54 and 55 after the cathode-anode current is ended in the associated time identifying tube; so that the operation of relay 39 connects ground through conductor 40 and the operated one or ones of relays 61, 62, 63, 64 and 65 to cause the operation of the translating relay corresponding to the length of the received signal impulse. Thus relay 91 is operated responsive to a .002 second impulse; relay 92 is operated responsive to a .004 second impulse; relay 93 is operated responsive to a .008 second impulse; relay 94 is operated responsive to a .016 second impulse; and relay 95 is operated responsive to a .032 second impulse. Each of relays 91, 92, 93, 94 and 95 is slow in releasing due to the condenser and resistance associated therewith. For instance condenser 81 associated with relay 91 discharges when relay 91 is operated and the charging of condenser 81 maintains the operation energization of relay 91 for about .100 second after its operating circuit is opened. Since both impulses of a signal consisting of the longest combination of signal impulses will be received within .100 second, the second impulse will effect the operation of a second one of relays 91, 92, 93, 94 and 95 before the relay operated responsive to the first impulse of a digit signal has released. With any two of relays 91, 92, 93, 94 and 95 operated, a circuit is closed for operating the corresponding one of the digit signal devices 1 to 0. If only one of relays 91, 92, 93, 94 and 95 is operated, none of the signal devices will be operated; and, if more than two of these relays are simultaneously operated, the marginal relay 99 is also operated. Relay 99 thereupon closes a circuit for operating a reorder signal whereby the calling station or operator will start the call over again.

While the impulses transmitted from station A are open circuit impulses, it is obvious that the arrangement may be modified so that the digit signal impulses constitute current impulses rather than open circuit impulses and further that the current impulses may be either alternating or direct current. These and other modifications may be made within the scope of the invention as defined by the claims.

What is claimed is:

1. In a signaling system in which the transmission of each of a plurality of different signals is effected by the same number of successive signal impulses, each impulse having a duration equal to a different one of a plurality of different predetermined intervals and each signal differing from the others of said plurality in the duration of one or more of its impulses, a signaling circuit comprising a resistance and impulse transmitting contacts in series, a first thermionic tube, the control grid of said tube connected to said resistance whereby the opening of said circuit by an impulse transmitting contact changes the potential of said grid with respect to the cathode of said tube, impulse measuring means comprising a thermionic tube and a relay for each of said predetermined intervals of time, means comprising a second thermionic tube and said first tube for operatively energizing said impulse measuring tubes in succession to measure the duration of a received impulse, a third thermionic tube and relay effective in combination with said first tube and said measuring tubes to operate one or more of the impulse measuring relays in accordance with the duration of the received impulse, translating relays one for each of said time measuring relays, means for operating the translating relay corresponding to the last operated one of said time measuring relays for each impulse, means for maintaining the translating relays operated for an interval sufficient for all of the impulses of a signal to have been received and the corresponding time measuring relays to have been operated, and signal means controlled by said translating relays to indicate the particular signal represented by the successive impulses constituting a signal.

2. In a signaling system in which the transmission of each of a plurality of different signals is effected by the transmission of the same number of successive impulses in an electrical signaling circuit, each impulse of a signal being of like character except that its length is equal to a different one of a plurality of different predetermined intervals of time, which plurality is larger than the number of impulses constituting each signal, each of said signals differing from the others in the length of one or more of its impulses, signal receiving means comprising impulse receiving means responsive to each impulse of any one of said different signals, impulse duration identifying relays, one relay for each of said different impulse lengths, for identifying the length of each signal impulse received by said impulse receiving means, means controlled by said impulse receiving means for operating one or more of said relays in succession responsive to each impulse of a signal in accordance with the length of the impulse, a plurality of selecting relays each corresponding to one of said duration identifying relays, means operated upon termination of each impulse for operating the selecting relay corresponding to the last operated duration identifying relay, means for maintaining the selecting relays operated for a predetermined time, and means operated by a combination of selecting relays for indicating the particular one of said signals which is received.

3. In a signaling system in which the transmission of each of a plurality of different signals is effected by the transmission of the same number of successive impulses in an electrical signaling circuit, each impulse of the signal being of like character except that its length is equal to a different one of a plurality of different predetermined intervals of time, which plurality is larger than the number of impulses constituting each signal, each of said signals differing from the others in the length of one or more of its impulses, signal receiving means comprising impulse receiving means responsive to each impulse of any one of said different signals, impulse duration identifying relays, one relay for each of said different impulse lengths, for identifying the length of each signal impulse received by said impulse receiving means, means controlled by said impulse receiving means for operating one or more of said relays in succession responsive to each impulse of a signal in accordance with the length of the impulse, translating relays, one for each of said duration identifying relays, means controlled by said duration identifying relays and by means responsive to the termination of each impulse for operating the corresponding translating relay responsive to such impulse of a signal, means for maintaining the operation of each operated translating relay until sufficient time has elapsed for all of the impulses of the signal to have been received, and signal means selectively operated by the operation of a combination of said translating relays responsive to the impulses of the signal to indicate the signal received.

4. In a signaling system in which the transmission of each of a plurality of different signals is effected by the transmission of the same number of successive impulses in an electrical signaling circuit, each impulse of a signal being of like character except that its length is equal to a different one of a plurality of different predetermined intervals of time, which plurality is larger than the number of impulses constituting each signal, each of said signals differing from the others in the length of one or more of its impulses, signal receiving means comprising a first thermionic tube responsive to each impulse of each incoming signal, impulse measuring means comprising thermionic tubes one tube for each of said different impulse lengths for measuring the length of each signal impulse received by said first tube, impulse duration identifying relays, a relay for each impulse measuring tube, means comprising said tubes for operating one or more of said relays depending upon the duration of each impulse received by said first tube, the duration of each impulse being identified by the last of said relays to be operated responsive to the impulse, signal devices, one for each of said different signals, translating relays, means controlled by said duration identifying relays and by means responsive to the termination of each impulse for operating the translating relay corresponding to the last operated of the duration identifying relays for each impulse of a signal, and means comprising a combination of translating relays for operating the signal device corresponding to any of said different signals incoming to said signal receiving means.

DOREN MITCHELL.

REFERENCES CITED

The following references are of record in the file of this patent:

UNITED STATES PATENTS

| Number | Name | Date |
|---|---|---|
| 1,597,763 | Chauveau | Aug. 31, 1926 |
| 1,695,840 | Chauveau | Dec. 18, 1928 |
| 1,867,209 | Chauveau | July 12, 1932 |
| 1,972,985 | Gardner | Sept. 11, 1934 |
| 2,165,924 | Goodrum | July 11, 1934 |
| 2,216,610 | Culbertson | Oct. 1, 1940 |
| 2,329,234 | Willis | Sept. 14, 1943 |
| 2,352,142 | Vaughan | June 20, 1944 |
| 2,413,440 | Farrington | Dec. 31, 1946 |
| 2,421,022 | Francis | May 27, 1947 |